(12) United States Patent
Vijayasankar et al.

(10) Patent No.: US 9,584,186 B2
(45) Date of Patent: *Feb. 28, 2017

(54) COMMUNICATIONS DEVICE FOR MULTI-TONE MASK MODE OPERATION

(71) Applicant: TEXAS INSTRUMENTS INCORPORATED, Dallas, TX (US)

(72) Inventors: Kumaran Vijayasankar, Allen, TX (US); Ramanuja Vedantham, Allen, TX (US); Anand G. Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,946

(22) Filed: Mar. 17, 2016

(65) Prior Publication Data

US 2016/0197647 A1 Jul. 7, 2016

Related U.S. Application Data

(63) Continuation of application No. 13/564,440, filed on Aug. 1, 2012, now Pat. No. 9,325,373.

(Continued)

(51) Int. Cl.
*H04B 3/54* (2006.01)
*H04B 3/30* (2006.01)
(Continued)

(52) U.S. Cl.
CPC .............. *H04B 3/544* (2013.01); *H04B 3/30* (2013.01); *H04B 3/54* (2013.01); *H04B 3/542* (2013.01); *H04H 20/42* (2013.01); *H04L 5/005* (2013.01); *H04L 25/024* (2013.01); *H04B 2203/5408* (2013.01)

(58) Field of Classification Search
CPC . H04B 3/30; H04B 3/54; H04B 3/542; H04B 3/544; H04L 25/024
See application file for complete search history.

(56) References Cited

U.S. PATENT DOCUMENTS 7,664,117 B2 * 2/2010 Lou ................. H04B 3/542
340/12.32
2003/0106067 A1 * 6/2003 Hoskins .............. H04L 12/2801
725/119

(Continued)

OTHER PUBLICATIONS

"PRIME Trchnology Whitepaper PHY, MAC and Convergence layers" published on Jul. 21, 2008.

(Continued)

*Primary Examiner* — Raj Jain
(74) *Attorney, Agent, or Firm* — Ronald O. Neerings; Charles A. Brill; Frank D. Cimino

(57) ABSTRACT

A communications device for Multi-Tone Mask (MTM) mode communications at a first router on a powerline communications (PLC) channel in a PLC network including a subnetwork including at least said first router associated with a plurality of nodes, comprising. A memory which stores a broadcast transmission MTM (BT-MTM) communications algorithm. A modem with processor is coupled to the memory. The processor is programmed to implement said BT-MTM communications algorithm, said BT-MTM communications algorithm.

10 Claims, 3 Drawing Sheets

Related U.S. Application Data

(60) Provisional application No. 61/513,847, filed on Aug. 1, 2011.

(51) Int. Cl.
 *H04H 20/42* (2008.01)
 *H04L 5/00* (2006.01)
 *H04L 25/02* (2006.01)

(56) References Cited

U.S. PATENT DOCUMENTS

| | | | |
|---|---|---|---|
| 2005/0035850 A1* | 2/2005 | Schwager | H04B 3/54 370/431 |
| 2008/0144567 A1 | 6/2008 | Agami et al. | |
| 2008/0219370 A1 | 9/2008 | Onggosanusi et al. | |
| 2010/0046412 A1 | 2/2010 | Varadarajan et al. | |
| 2011/0182178 A1 | 7/2011 | Du et al. | |
| 2012/0093198 A1* | 4/2012 | Dabak | H04B 3/542 375/139 |
| 2015/0063285 A1* | 3/2015 | Vedantham | H04B 3/544 370/329 |
| 2015/0110163 A1* | 4/2015 | Vedantham | H04B 3/542 375/222 |

OTHER PUBLICATIONS

Sanz et al, "PRIME from the definition to a SoC solution" published in IEEE International Symposium on Power Line Communications and its Applications, Mar. 29-Apr. 1, 2009.

Liu etal, "Multiband OFDM p-Persistent CSMACD based Indoor Powerline Communications Systems" featured in First International Conference on Ubiquitous and Future Networks published Jun. 7-9, 2009.

Arzuaga, "PRIME interoperability tests and results from field", "2010 First IEEE International Conference on Smart Grid Communications", pp. 126-130, Oct. 4-6, 2010.

\* cited by examiner

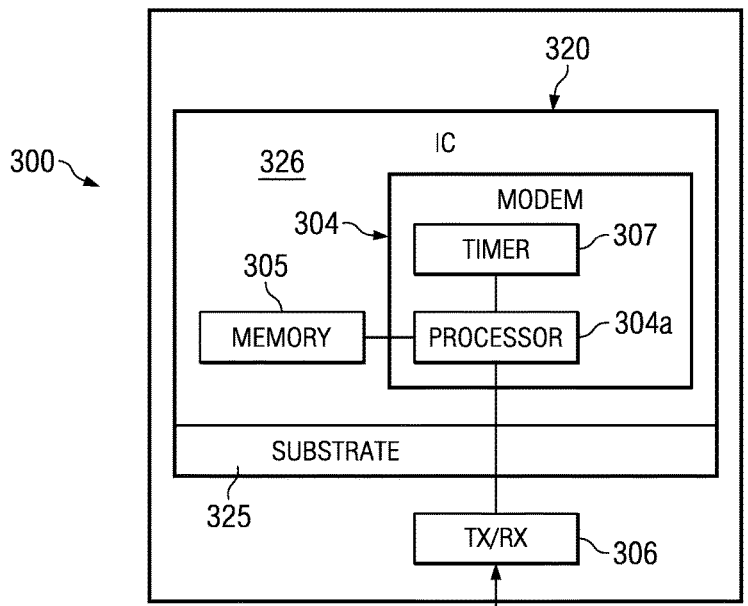
FIG. 3   TO POWERLINE 340
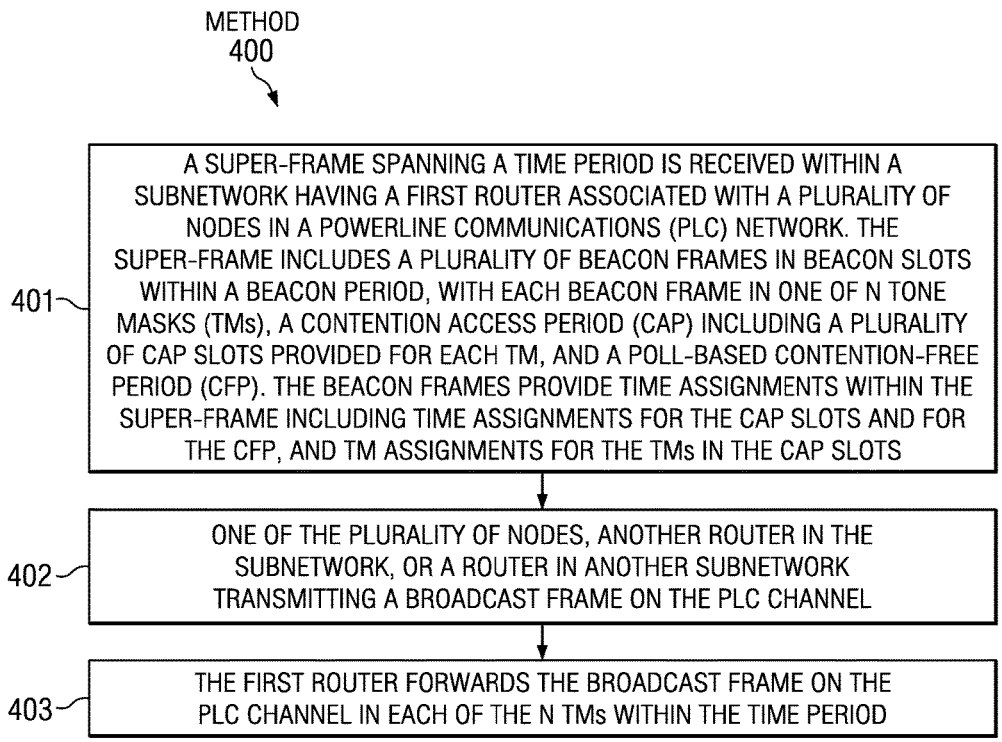
FIG. 4

COMMUNICATIONS DEVICE FOR MULTI-TONE MASK MODE OPERATION

CROSS REFERENCE TO RELATED APPLICATIONS

This application is a continuation of and claims benefit of U.S. patent application Ser. No. 13/564,440 entitled "BROADCAST TRANSMISSION IN MULTI-TONE MASK MODE OPERATION" filed Aug. 1, 2012, which is herein incorporated by reference in its entirety.

This application and the subject matter disclosed herein claims the benefit of Provisional Application Ser. No. 61/513,847 entitled "BROADCAST TRANSMISSION IN MULTI-TONE MASK MODE" filed Aug. 1, 2011, which is herein incorporated by reference in its entirety.

The subject matter in this application is related to copending Non-Provisional patent application Ser. No. 13/443,123 filed Apr. 10, 2012, entitled "BEACON-ENABLED COMMUNICATIONS FOR VARIABLE PAYLOAD TRANSFERS" and Ser. No. 13/457,638 filed Apr. 27, 2012, entitled "SUPERFRAME COORDINATION IN BEACON-ENABLED NETWORKS", both assigned to Texas Instruments Incorporated.

FIELD

Disclosed embodiments relate generally to the field of powerline communications.

BACKGROUND

Powerline communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Current and next generation narrow band PLC are multi-carrier based, such as orthogonal frequency division multiplexing (OFDM)-based (as opposed to frequency shift keying (FSK)-based) in order to get higher network throughput. OFDM uses multiple orthogonal subcarriers to transmit data over frequency selective channels.

FIG. 1 is a system model depiction of a PLC network 100 for local utility PLC communications, configured for U.S. deployment: LV nodes 105 include meters having modems 110 which during uplink communications transmit usage and load information ("data") using the low voltage (LV) access network portion 125a of powerline 125 through the transformer 120 over the MV network portion 125b of powerline 125 to one or more medium voltage (MV) routers (also called switch nodes) 130. In turn, each MV router 130 forwards this data to the data concentrator (or base station) 140, which sends the data to the utility company 160 over a telecommunication backbone 150. During downlink communications (router 130 to LV node 105) the direction of communications is reversed relative to uplink communications.

Multi-Tone Mask (MTM) mode (or "tone masking") refers to the use of multiple tone-masks/sub-bands to enable nodes in the network to each select individual tones within the band utilized by the network for network communications including PLC networks such as those based on the IEEE P1901.2. MTM mode for tones allows avoidance of parts of the network spectrum occupied by high levels of external noise. MTM mode also allows co-existence with incumbent communication technologies (such IEEE P1901.2 with IEC 61334, IEEE P1901 and ITU G.hn) that might be sharing the PLC channel.

When operating in MTM mode, only one/set of TMs may be optimal (typically the lowest noise) for each particular unidirectional/bidirectional link. After each node (device) performs an initial tone mask scanning, the nodes determine which tones are optimal for their UL communications (node to router) and for their DL communications (router to node). The UL and DL may have a different optimal TM/sub-band, and thus may be operated using different tones. Thus, while operating in the MTM mode where each node uses a different UL/DL TM for communications, the router 130 must support all the network nodes served.

SUMMARY

Disclosed embodiments provide mechanisms for broadcast transmissions in PLC networks operating using Multi-Tone Mask (MTM) mode. In a conventional broadcast, the source sends a single broadcast frame on a particular frequency (tone) with a broadcast destination address which is received by all of its neighbors in its subnetwork. In the MTM mode in contrast, since the different neighboring nodes are operating in different TMs, and only the router has access to all the TMs, the router forwards (rebroadcasts) the broadcast transmission in each of the TMs, generally during different periods of time for each TM.

The frequency and timing information is generally provided by a super-frame structure that spans a time period which defines different periods of time (slots) including a plurality of beacon slots, Contention Access Period (CAP) including a plurality of CAP slots and a poll-based contention free period (CFP). This time period repeats itself during operation of the PLC network. In the MTM mode of operation, the time period is divided between different slots for each of a plurality of TMs. Hence, during a given slot communications can happen only in one TM. Disclosed embodiments provide broadcast mechanisms that enable a router and its associated nodes operating in MTM to ensure at least one broadcast transmission reaches all the nodes in its region.

One embodiment comprises a method of MTM mode communications in a PLC network including at least a first router associated with a plurality of nodes. A super-frame spanning a time period is received within the subnetwork. The super-frame includes beacon frames in beacon slots within a beacon period, with each beacon frame in one of N TMs, a contention access period (CAP) including a plurality of CAP slots provided for each TM, and a poll-based contention-free period (CFP). The beacon frames provide time assignments within the super-frame including time assignments for the CAP slots and for the CFP, and TM assignments for the TMs in the CAP slots. One of nodes, another router in the subnetwork, or a router in another subnetwork (e.g., an adjacent subnetwork) transmits a broadcast frame on the PLC channel. The first router forwards the broadcast frame on the PLC channel in each of the N TMs within the time period.

BRIEF DESCRIPTION OF THE DRAWINGS

Reference will now be made to the accompanying drawings, which are not necessarily drawn to scale, wherein:

FIG. 3 is a block diagram schematic of a communication device having a disclosed modem that implements a disclosed MTM mode communications algorithm for PLC networks, according to an example embodiment.

FIG. 4 is a flowchart for an example method for MTM mode communications in a PLC network, according to an example embodiment.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection, unless qualified as in "communicably coupled" which includes wireless connections. Thus, if a first device couples to a second device, that connection may be through a direct electrical connection, or through an indirect electrical connection via other devices and connections.

As described above, while operating in MTM mode each node in the PLC network may utilize a different UL/DL TM for communications, and the router is required to support all of them. To enable MTM mode operation, since the TM/subband for each node may be different, a broadcast mechanism is needed to enable transmission of broadcast frames. Disclosed embodiments address this need by providing broadcast transmission MTM mode communications algorithms for broadcast frames which support the MTM mode of operation in PLC networks. In a broadcast transmission, there is broadcast destination address, and there will be no acknowledgement (ACK) frame sent in response to the broadcast frame. In contrast, in the case of non-broadcast (unicast) communications, a specific destination address is included, and there will typically be an ACK frame from destination node to the source node after receipt of the unicast frame.

Figure 1:
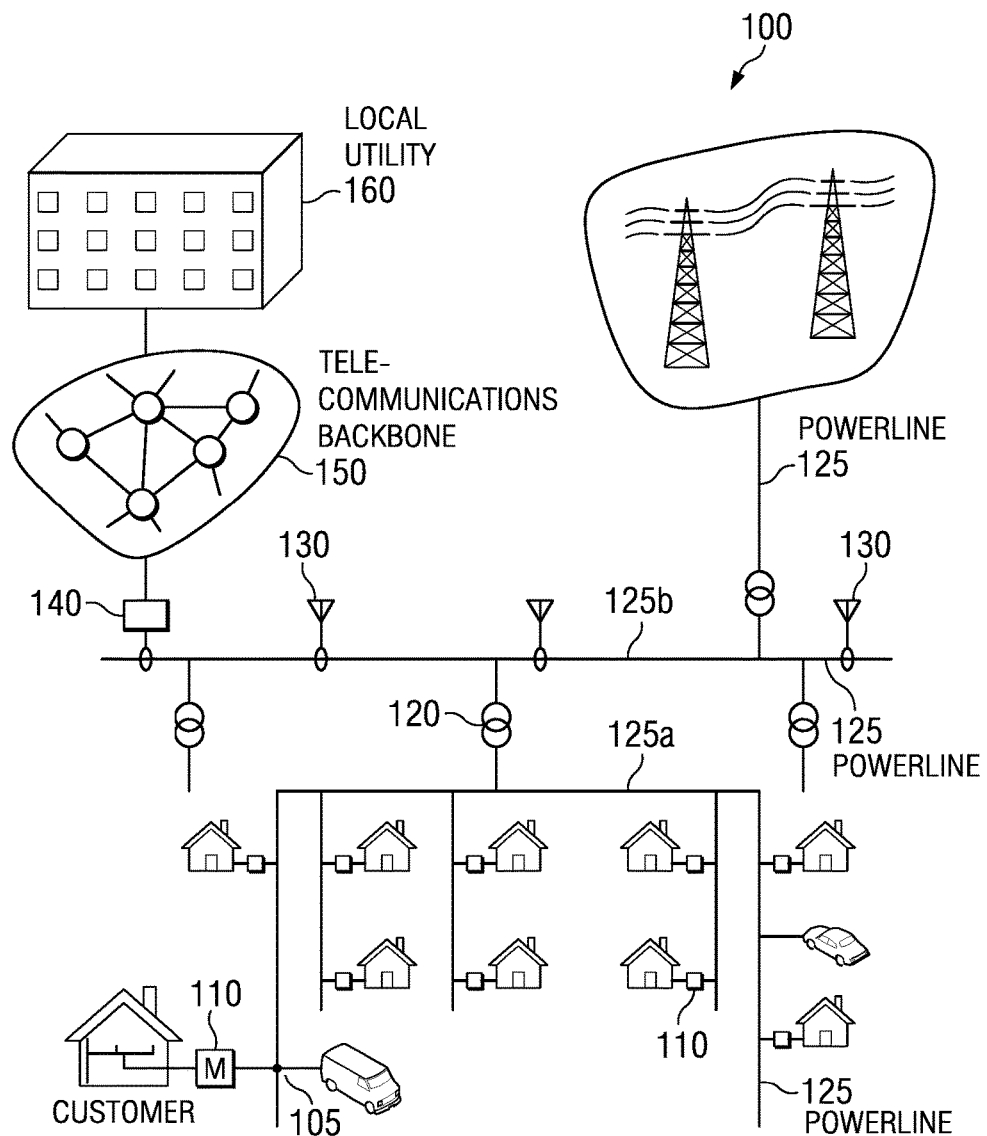
FIG. 1 is a depiction of a known PLC network for local utility PLC communications for a U.S. deployment that disclosed mechanisms for broadcast transmissions in PLC networks operating using MTM mode may utilize.
Figure 2:
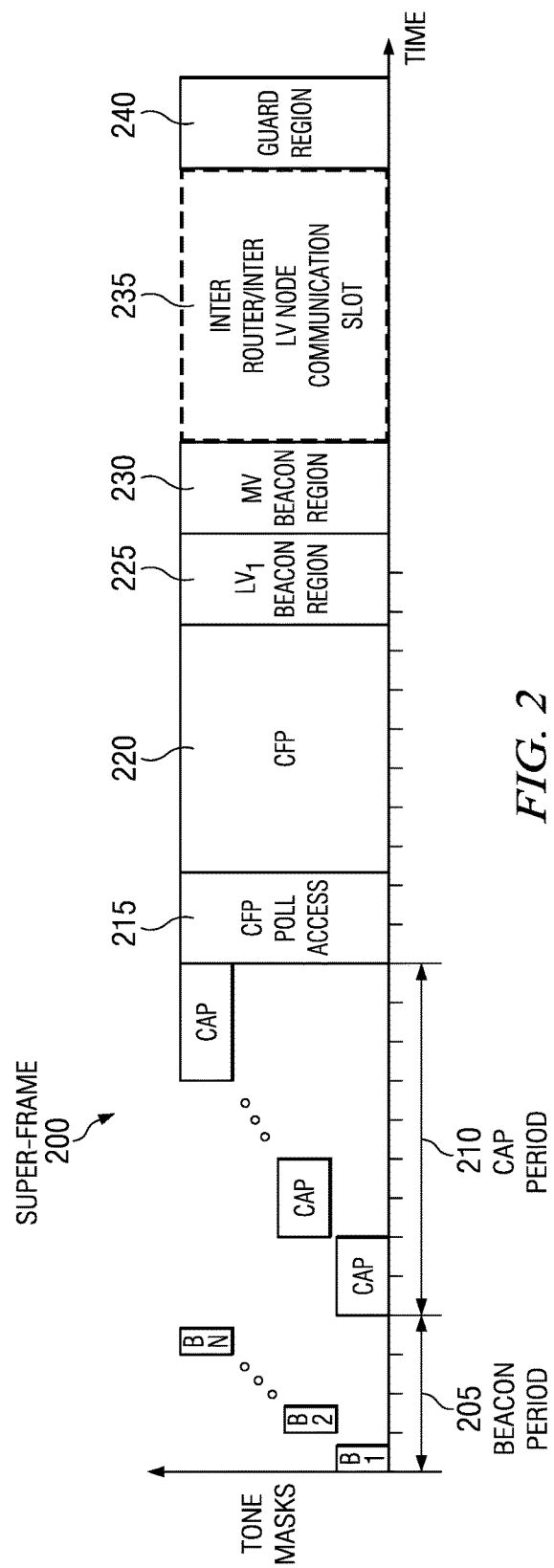
FIG. 2 shows the structure of one example Media Access Control (MAC) super-frame which provides frequency and timing information to enable MTM mode operation in a PLC network, according to an example embodiment.

FIG. 2 shows the structure of an example MAC super-frame 200 which provides frequency (TM) assignments and timing assignments which enables MTM mode operation in a PLC network, such as the PLC network 100 depicted in FIG. 1. The super-frame 200 is useful for cases including when the MTM mode is applied to a MV-LV application where a MV node operates as a router 130, and LV1 nodes such as node 105 operate as nodes trying to associate to this router 130. LV1 nodes can also act as a router for other LV nodes, while acting as a router operating in the full allocated Federal Communications Commission (FCC) band.

Super-frame 200 includes a plurality of beacon frames in a plurality of beacon slots (B1, B2, Bn) within a beacon period 205 of the super-frame 200, with a beacon frame for each of the N>1 TMs. There are thus N beacon frames in N beacon slots with one beacon frame for each TM assigned/allotted. The beacons (B1, B2, . . . Bn) include time assignments within the super-frame including time assignments for the CAP slots and for the CFP period, and TM assignments for the N TMs in the CAP slots, as well as a conventional timestamp for local clock synchronization, beacon interval information, device/network capability information, whether polling is supported, and encryption details.

Super-frame 200 includes CAP period 210 including multiple CAP slots, with one CAP slot allocated for each of the N TMs. A CFP poll access period 215 is included, during which MV nodes (i.e. routers in U.S. deployments, or routers more generally try to gain access to use the CFP poll access period 215. Super-frame 200 also includes a poll-based CFP 220. A poll-based CFP refers to contention-free access where the router polls each node for data, and if data is available, the node will transmit the data after receiving the poll from the router.

A LV1 beacon region 225 follows the poll-based CFP 220, which is where the LV1 nodes which connect to MV routers (in U.S. deployments) use CSMA/CA to transmit beacons. Super-frame 200 also includes MV beacon region 230. In MV beacon region 230 all MV nodes in the PLC network can use CSMA/CA to transmit beacons. Super-frame 200 also includes an inter-router/inter-LV node communication slot 235, and a guard region 240 to enable synchronization between routers.

Super-frame 200 is only one particular example super-frame that may be used with disclosed embodiments. More generally, a super-frame may include a plurality of beacon frames in a plurality of beacon slots, a plurality of CAP slots following the beacon frames/slots, a CFP poll access slot following the CAP slots, a CFP following the CFP poll access slot, an inactivity period following the CFP slot, a beacon period following the inactivity period, and a communication slot following the beacon period.

In some implementations, each of the beacon frames may occur over a respective subband of a sequence of frequency subbands, and each of the plurality of CAP slots may occur over a respective subband of the sequence of frequency subbands. Moreover, the sequence of frequency subbands may be randomly selected. The communication device may be configured to compete with the other communication device(s), during the CAP slot corresponding to its UL Tone mask. Additionally or alternatively, the communication device may be configured to compete with the other communication device(s), during at least a portion of the beacon period, for use of a plurality of beacon slots and a plurality of CAP slots in a subsequent super-frame.

Defining the respective tones in the super-frame 200 for each network node can be accomplished in a variety of manners. For example, by a tone mask scanning procedure that involves a discovery or setup operation may be used, where the method may include detecting at least one beacon frame during one of the plurality of beacon slots, the detected beacon frame having been transmitted over a respective frequency subband. The method may also include creating a downlink subband report based, at least in part, upon the detected beacon frame and transmitting the downlink subband report over each of the plurality of frequency subbands during respective intermediate slots. The method may further include receiving a subband allocation message, the subband allocation message identifying the first of the plurality of frequency subbands as suitable for subsequent downlink communications and identifying the second of the plurality of frequency subbands as suitable for subsequent uplink communications.

In some embodiments, the intermediate slots may be Contention Access Period (CAP) slots during which one or more other communications devices are allowed to compete with the communication device for access to a communication medium. In that case, the method may include receiving data over the first of the plurality of frequency subbands during a first CAP slot corresponding to the first frequency subband, and then transmitting an ACK message over the second of the plurality of frequency subbands during the first CAP slot. Additionally or alternatively, the method may include transmitting data over the second of the plurality of frequency subbands during a second CAP slot corresponding to the second frequency subband, and then receiving an acknowledgement message over the first of the plurality of frequency subbands during the second CAP slot.

In other embodiments, the intermediate slots may be Discovery Phase (DP) slots during which the communication device may abstain or be otherwise prohibited from transmitting data frames. In another illustrative, non-limiting embodiment, a method may include implementing a super-frame structure having a plurality of bacon frames in a plurality of beacon slots, a plurality of CAP slots following the plurality of beacon frames, and a poll-based CFP slot following the plurality of CAP slots, each of the plurality of beacon frames and each of the plurality of CAP slots corresponding to a respective one of a plurality of frequency subbands, and the poll-based CFP slot corresponding to a combination of the plurality of frequency subbands. The method may also include transmitting a poll request over a first of the plurality of frequency subbands during the poll-based CFP slot and, in response to the poll request, receiving a data frame over a second of the plurality of frequency subbands during the poll-based CFP slot. The method may also include, in response to having received the data frame, transmitting an acknowledgement message over the first of the plurality of frequency subbands during the poll-based CFP.

During the discovery or setup procedure, the method may include transmitting a plurality of beacon frames, each of the plurality of beacon frames transmitted over a corresponding one of the plurality of beacon slots. The method may also include receiving a downlink subband report during at least one of the plurality of CAP slots, and then transmitting a subband allocation message over the first of the plurality of frequency subbands during the poll-based CFP slot, the subband allocation message identifying the first of the plurality of frequency subbands as suitable for subsequent downlink communications and identifying the second of the plurality of frequency subbands as suitable for subsequent uplink communications.

In some implementations, the method may include transmitting data over the first of the plurality of frequency subbands during a first CAP slot corresponding to the first frequency subband, and then receive an ACK message over the second of the plurality of frequency subbands during the first CAP slot. Additionally or alternatively, the method may include receiving data over the second of the plurality of frequency subbands during a second CAP slot corresponding to the second frequency subband, and transmitting an acknowledgement message over the first of the plurality of frequency subbands during the second CAP slot.

In yet another illustrative, non-limiting embodiment, a method may include implementing a first super-frame structure having a plurality of beacon frames in a plurality of beacon slots, a plurality of DP slots following the plurality of beacon frames, and a poll-based CFP slot following the plurality of DP slots, each of the plurality of beacon frames and each of the plurality of DP slots corresponding to a respective one of a plurality of frequency subbands, and the poll-based CFP slot corresponding to a combination of the plurality of frequency subbands. The method may also include transmitting a poll request over a first of the plurality of frequency subbands during the poll-based CFP slot and, in response to the poll request, receive a data packet over a second of the plurality of frequency subbands during the poll-based CFP slot.

A subnetwork is defined herein as at least one router and a group of nodes connected to it within a communication range (or neighborhood). During PLC network operation while in MTM mode, upon reception of a broadcast frame, such as from a LV node in the subnetwork, another router in the subnetwork, or a router in another sub-network of the PLC network, the MV router 130 can:

a. Forward (retransmit) the broadcast frame the PLC channel having the broadcast frame repeated in different frequencies (TMs), with the different frequencies transmitted at different periods of time as assigned/specified in the super-frame 200 using any of the following timing schemes:

1. transmitting the broadcast frame using each TM during their corresponding CAP slots in CAP period 210.

2. Consecutively (one after the other, no particular order needed) transmitting the broadcast frame in each TM during the CFP 220.

3 Simultaneously transmitting the broadcast frame in each TM during the CFP 220, thus placing the same broadcast frame in each TM and simultaneously transmitting the broadcast frame during a single frame transmission time interval. The nodes receiving the broadcast frame have their receivers tuned to their assigned/allocated DL TM, and can decode frames in their DL TM irrespective of the content in the other TMs.

The router can forward the broadcast frame on the PLC channel in the full band (i.e., a band that comprises of all the TMs designated in the super-frame 200) during inter router/inter LV node communication slot 235, so that the other routers in the network can receive the broadcast frame. Router-Router (MV-MV in U.S. deployments) communications can occur in the full band.

Upon reception of a broadcast frame from the MV router 130, the LV nodes can forward the broadcast frame in full band to other LV nodes during the inter router/inter LV node communication slot 235. Upon reception of a broadcast frame from a LV node, the LV1 node can forward the broadcast frame in its UL TM to the MV router it is associated with (as with any other unicast transmission the LV node makes), which can then forward the broadcast frame in each of the N TMs within the time period defined by the super-frame.

FIG. 3 is a block diagram schematic of a communications device 300 having a disclosed modem 304 that implements using a disclosed algorithm for MTM mode communications in PLC networks at a router, according to an example embodiment. Modem 304 includes a processor (e.g., a digital signal processor, (DSP)) 304a coupled to an associated memory 305 that that stores a disclosed BT-MTM mode communications algorithm which provides code for the BT-MTM algorithm. Memory 305 comprises non-transitory machine readable storage, for example, static random-access memory (SRAM). In operation, the processor 304a is programmed to implement the BT-MTM algorithm. Modem 304 includes a timer 307, such as for ACK transmission, Carrier Sense Multiple Access/collision avoidance (CSMA)/CA) back-off and data transmission purposes.

The PLC transceiver (TX/RX) 306 is communicably coupled to the modem 304 for coupling of the communications device 300 to the shared powerline 340. Transceiver 306 facilitates communications with other SNs and the BN on the powerline 340.

The modem 304 is shown formed on an integrated circuit (IC) 320 comprising a substrate 325 having a semiconductor surface 326, such as a silicon surface. Memory 305 may be included on the IC 320. In another embodiment the modem 304 is implemented using 2 processor chips, such as 2 DSP chips. Besides the DSP noted above, the processor 304*a* can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

FIG. 4 is a flowchart for an example method 400 for Multi-Tone Mask (MTM) mode transmission in a powerline communications (PLC) network including a subnetwork having at least a first router associated with a plurality of nodes, according to an example embodiment. Step 401 comprises a super-frame spanning a time period is received within the subnetwork. The super-frame includes beacon frames in beacon slots within a beacon period, with each beacon frame in one of N TMs, a CAP period including a plurality of CAP slots provided for each TM, and a poll-based CFP. The beacon frames provide time assignments within the super-frame including time assignments for the CAP slots and for the CFP, and TM assignments for the TMs in the CAP slots.

Step 402 comprises one of plurality of nodes, another router in the subnetwork, or a router in another subnetwork transmitting a broadcast frame on the PLC channel. In step 403, the first router forwards the broadcast frame on the PLC channel in each of the N TMs within the time period.

In one embodiment the broadcast frame is received by the first router, and the forwarding comprises the first router transmitting the broadcast frame using each of the N TMs during corresponding ones of the plurality of CAP slots. In another embodiment, the broadcast frame is received by the first router, and the forwarding comprises the first router transmitting the broadcast frame consecutively in each of the N TMs during the CFP. In yet another embodiment, the broadcast frame is received by the first router, and the forwarding comprises the first router simultaneously transmitting the broadcast frame in each of the N TMs during the CFP using a single frame transmission time.

In another embodiment, the super-frame further comprises an inter router/inter LV node communication slot, wherein the broadcast frame is transmitted by the first router, and the forwarding comprises the first router transmitting the broadcast frame in a full band during the inter router/inter LV node communication slot. This embodiment allows the first router to transmit the broadcast frame so that other routers in the PLC network can receive the broadcast frame. In a related embodiment, the super-frame further comprises an inter router/inter LV node communication slot, the broadcast frame is transmitted by a second node of the plurality of nodes, and the broadcast frame is received by the first node, the TM assignment provided by the plurality of beacon frames for the first node for uplink communications is a first uplink TM, and wherein the forwarding further comprises the first node transmitting the broadcast frame at the first uplink TM to the first router.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A communications device for Multi-Tone Mask (MTM) mode communications at a first router on a powerline communications (PLC) channel in a PLC network including a subnetwork including at least said first router associated with a plurality of nodes, comprising:
   a memory which stores a broadcast transmission MTM (BT-MTM) communications algorithm;
   a modem coupled to said memory, said modem comprising:
   a processor;
   wherein said processor is communicably coupled to said memory, and wherein said processor is programmed to implement said BT-MTM communications algorithm, said BT-MTM communications algorithm:
   obtaining time assignments and TM assignments from a received a super-frame spanning a time period including:
      a plurality of beacon frames in a plurality of beacon slots within a beacon period, with each of said plurality of beacon frames in one of N TMs, where N is greater than 1,
      a contention access period (CAP) including a plurality of CAP slots, wherein one of said CAP slots is provided for each said N TMs, and
      a poll-based contention-free period (CFP),
      wherein said plurality of beacon frames provide said time assignments within said super-frame including time assignments for said plurality of CAP slots and for said CFP, and said TM assignments for said N TMs in said plurality of CAP slots;
   a PLC transceiver communicably coupled to said modem for transmitting frames on said PLC channel,
   wherein said modem configured for responding to a broadcast frame received on said PLC channel from one of said plurality of nodes, another router in said subnetwork, or a router in another subnetwork by directing information in said broadcast frame to said PLC transceiver,
   wherein said PLC transceiver forwards said broadcast frame on said PLC channel in each of said N TMs within said time period,
   wherein said super-frame further comprises an inter router/inter LV node communication slot,
   wherein said broadcast frame is transmitted by a second node of said plurality of nodes, wherein said broadcast frame is received by a first node of said plurality of nodes, wherein said TM assignment provided by said plurality of beacon frames for said first node for uplink communications is a first uplink TM, and wherein said forwarding further comprises said first node transmitting said broadcast frame at said first uplink TM to said first router.

2. The communications device of claim 1, wherein said modem is formed on an integrated circuit (IC) comprising a substrate having a semiconductor surface, wherein said processor comprises a digital signal processor (DSP).

3. The communications device of claim 1, wherein said forwarding comprises said PLC transceiver transmitting said broadcast frame using each of said N TMs during corresponding ones of said plurality of CAP slots.

4. The communications device of claim 1, wherein said forwarding comprises said PLC transceiver transmitting said broadcast frame consecutively in each said N TMs during said CFP.

5. The communications device of claim 1, wherein said forwarding comprises said PLC transceiver transmitting said broadcast frame in each said N TMs during said CFP using a single frame transmission time.

6. A communications device for Multi-Tone Mask (MTM) mode communications at a first router on a powerline communications (PLC) channel in a PLC network including a subnetwork including at least said first router associated with a plurality of nodes, comprising:
 a memory which stores a broadcast transmission MTM (BT-MTM) communications algorithm;
 a modem coupled to said memory, said modem comprising:
  a processor;
  wherein said processor is communicably coupled to said memory, and wherein said processor is programmed to implement said BT-MTM communications algorithm, said BT-MTM communications algorithm:
   obtaining time assignments and TM assignments from a received a super-frame spanning a time period including:
    a plurality of beacon frames in a plurality of beacon slots within a beacon period, with each of said plurality of beacon frames in one of N TMs, where N is greater than 1,
    a contention access period (CAP) including a plurality of CAP slots, wherein one of said CAP slots is provided for each said N TMs, and
    a poll-based contention-free period (CFP),
   wherein said plurality of beacon frames provide said time assignments within said super-frame including time assignments for said plurality of CAP slots and for said CFP, and said TM assignments for said N TMs in said plurality of CAP slots;
 a PLC transceiver communicably coupled to said modem for transmitting frames on said PLC channel,
 wherein said modem configured for responding to a broadcast frame received on said PLC channel from one of said plurality of nodes, another router in said subnetwork, or a router in another subnetwork by directing information in said broadcast frame to said PLC transceiver,
 wherein said PLC transceiver forwards said broadcast frame on said PLC channel in each of said N TMs within said time period,
 wherein said super-frame further comprises an inter router/inter LV node communication slot,
 wherein said broadcast frame is transmitted by a second node of said plurality of nodes, wherein said broadcast frame is received by a first node of said plurality of nodes, wherein said TM assignment provided by said plurality of beacon frames for said first node for uplink communications is a first uplink TM, and
 wherein said forwarding comprises said PLC transceiver transmitting said broadcast frame in a full band during said inter router/inter LV node communication slot.

7. The communications device of claim 6, wherein said broadcast frame is received by said first router, and wherein said forwarding comprises said first router transmitting said broadcast frame using each of said N TMs during corresponding ones of said plurality of CAP slots.

8. The communications device of claim 6, wherein said broadcast frame is received by said first router, and wherein said forwarding comprises said first router transmitting said broadcast frame consecutively in each said N TMs during said CFP.

9. The communications device of claim 6, wherein said broadcast frame is received by said first router, and wherein said forwarding comprises said first router simultaneously transmitting said broadcast frame in each said N TMs during said CFP using a single frame transmission time.

10. The communications device of claim 6, wherein said super-frame further comprises an inter router/inter LV node communication slot, wherein said broadcast frame is transmitted by said first router, and wherein said forwarding comprises said first router transmitting said broadcast frame in a full band during said inter router/inter LV node communication slot.

* * * * *